United States Patent Office

3,685,983
Patented Aug. 22, 1972

3,685,983
MANGANESE FIBERS USEFUL FOR GALVANIC CELL ELECTRODES
Demetrios V. Louzos, Rocky River, Ohio, assignor to Union Carbide Corporation, New York, N.Y.
Filed Apr. 6, 1970, Ser. No. 25,866
Int. Cl. C22c 21/00
U.S. Cl. 75—.5 R                2 Claims

ABSTRACT OF THE DISCLOSURE

Stable, high surface area manganese fibers having a central spine portion with some poly-directional side growths. The manganese fibers are prepared by the electrolysis of a soluble manganese salt-containing electrolyte solution under conditions of extremely high cathode current density. Galvanic cell electrodes are fabricated using the manganese fibers by compression molding techniques.

---

This invention relates to novel manganese fibers and to a process for their preparation. In one aspect, the invention relates to galvanic cell electrodes fabricated from the novel manganese fibers and to the use of these electrodes in both primary and secondary galvanic cells and especially as manganese dioxide cathodes in dry cells of the type employing an alkaline electrolyte.

BACKGROUND OF THE INVENTION

Galvanic cell cathodes for use particularly in primary and secondary alkaline dry cells are usually made by compression molding a mixture of finely-divided particles of an oxidic depolarizer material and electrically conductive particles such as graphite, acetylene black and in some cases nickel powder. One of the most common depolarizer materials for use in these cathodes is manganese dioxide which may be obtained by suitably processing a high grade of manganese dioxide ore material.

The principal difficulty encountered with manganese dioxide cathodes of this type is the tendency of the cathode body to swell on discharge in the alkaline electrolyte of the dry cell. When swelling occurs, the close interparticle contact between the manganese dioxide particles and the electrically conductive particles achieved throughout the cathode body during the molding procedure is at least partially lost. Some of the manganese dioxide particles thus become electronically isolated and cannot enter into further electrode reactions.

The problem of manganese dioxide cathode swelling has been solved for the most part by incorporating a cement binder such as portland cement within the cathode mixture as taught in U.S. Pat. No. 2,962,540 to K. Kordesch. The cement binder is uniformly admixed with finely-divided particles of the depolarizer material, e.g., manganese, dioxide, and conductive particles and constitutes a substantially continuous common matrix for uniting the particles together throughout the cathode body. The major drawback, however, in the use of the cement binder is that the binder is electrochemically inert and since the binder constitutes a substantial portion of the cathode mixture, i.e., between about 5 and 20 percent by weight, the energy output per unit weight capability of the cathode is lowered.

SUMMARY OF THE INVENTION

The invention contemplates the provision of novel manganese fibers possessing certain properties which make them ideal for use in fabricating galvanic cell electrodes. The manganese fibers of the invention are quite readily distinguishable in physical appearance from other forms of manganese material heretofore known in the art. The manganese fibers of the invention may be defined as fibers having a central spine portion with some poly-directional side growths. The term "poly-directional" as used herein refers to the physical arrangement of the side growths which during formation tend to grow in many different directions or along many planes and is used specifically to denote the three dimensional character of the fibers as distinguished from the flat fern-like structure of dendritic particles.

The novel manganese fibers of the invention are primarily characterized by their high specific surface area, purity and stability. The manganese fibers are stable in that they do not rapidly oxidize upon exposure to the atmosphere. The length of the manganese fibers is relatively short and will vary up to a maximum length of about 0.1 inch. The average diameter or width of the fibers is about 0.0005 inch.

In the practice of the invention, the novel manganese fibers are prepared by the electrolysis of a soluble manganese salt-containing electrolyte under conditions of extremely high cathode current density. Generally, the cathode current density should be at least about 500 amperes per square foot.

The process for preparing the novel manganese fibers of the invention may be carried out at about room temperature in a typical electrolysis cell using an anode suitably of manganese and a thin cathode, e.g., manganese, suspended in the electrolyte bath. The fibers electroform at the cathode and may be broken off and collected at the bottom of the bath, or if the fibers are not removed and the electrolysis is allowed to proceed, the fibers tend to electrodeposit in the form of an interconnected skeletal manganese fibrous mat which resembles "finger coral" in appearance. This interconnected skeletal fibrous mat consists basically of multiple fibers joined to one or more neighboring fibers throughout the mat. By the term "electroform" or "electroformation" as used herein is meant the production of manganese fibers by electrodeposition.

Galvanic cell electrodes can be readily fabricated using the novel manganese fibers of the invention by conventional compression molding techniques. The manganese fibers prepared as described above are placed within the mold and then compression molded to form an electrode compact of the desired size and configuration. In forming the compact, the interconnected skeletal manganese fibrous mats are preferably used. If the individual fibers are used, it is essential that they should be thoroughly intermingled when placed within the mold. When compression is applied, the fibers readily interlock or interknit producing a highly cohesive electrode body which is capable of supporting its own weight and retaining the shape in which it is molded.

Galvanic cell cathodes can be fabricated in accordance with the invention using an oxidized form of the novel manganese fibers of the invention. The manganese fibers may be first subjected to an electro-oxidizing treatment to convert the surfaces of the fibers to manganese dioxide. The oxidized fibers are then placed within the mold and compressed to form the cathode body in the same manner as described above.

The galvanic cell cathodes fabricated in accordance with the invention are most advantageously used in both primary and secondary alkaline dry cells. The principal advantage of such cathodes is that they are self-supporting and can be fabricated without the need for an electrochemically inert binder for the active material such as employed in cathodes of the prior art.

Galvanic cell electrodes fabricated from the novel manganese fibers or mats in the manner described above may also be used as metallic manganese anodes, for example, in a manganese-manganese dioxide cell system.

BRIEF DESCRIPTION OF THE DRAWING

The invention will be more particularly understood by reference to the following detailed description of the preferred embodiments thereof, taken in conjunction with the accompanying drawing, wherein.

DESCRIPTION OF THE PREFERRED EMBODIMENTS

Figure 1:
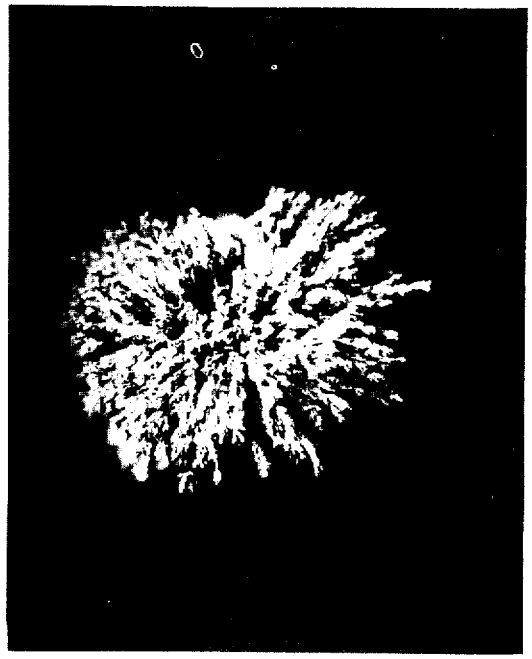
FIG. 1 is a photomicrograph showing an interconnected, skeletal manganese fibrous mat under 10 fold magnification.
Figure 2:
FIG. 2 is a photomicrograph showing the interconnected skeletal manganese fibrous mat under 100 fold magnification.

Referring to FIG. 1, there is shown a photomicrograph of a typical interconnected, skeletal manganese fibrous mat under 10 fold magnification. As will be seen from the photomicrograph, the fibrous mat closely resembles "finger coral" in appearance. It will be further seen from a close inspection of the photomicrograph that the mat is basically a skeletal structure of interconnected fibers joined to one or more neighboring fibers. FIG. 2 shows a photomicrograph of the same skeletal fibrous mat under 100 fold magnification. It will be seen from this photomicrograph that the individual manganese fibers consist essentially of a central spine portion with some polydirectional side growths.

Figure 3:
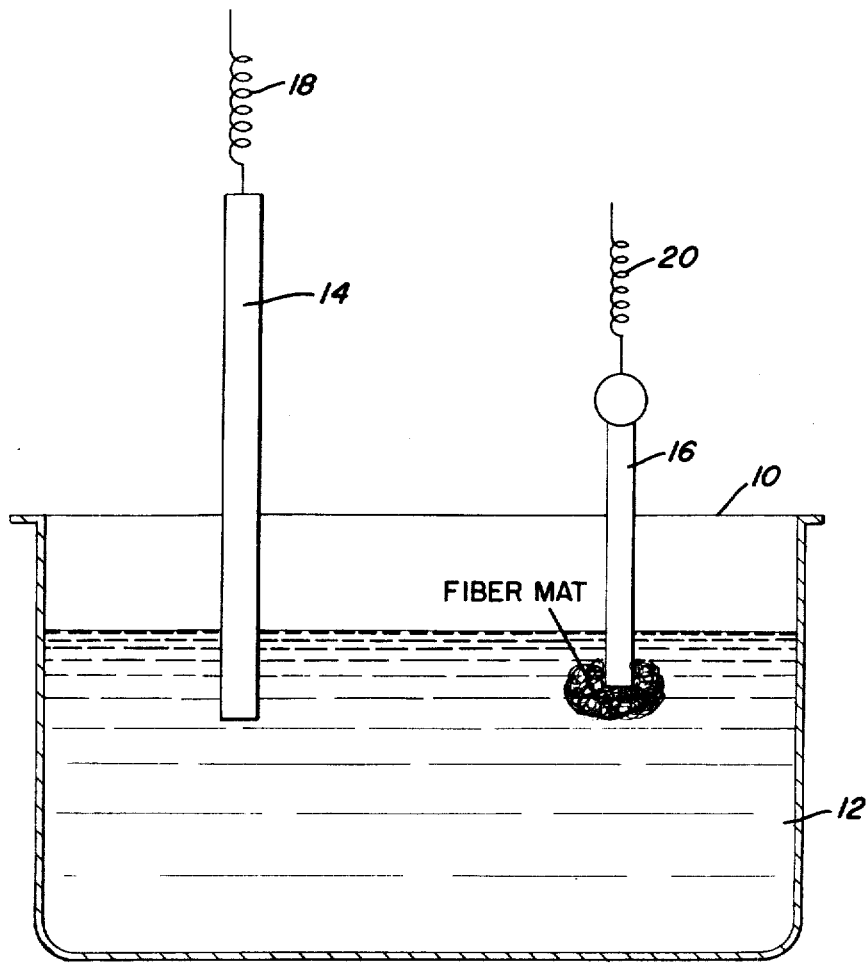
FIG. 3 is a schematic view of a typical electrolysis cell used for preparing the manganese fibers in accordance with the invention.

FIG. 3 shows schematically a typical electrolysis cell for preparing manganese fibers in accordance with the invention. The cell consists of an open tank 10 which is approximately three-quarters filled with a soluble manganese salt-containing electrolyte bath 12. Suspended in the electrolyte bath 12 is an anode 14, suitably a manganese rod. A cathode 16, e.g., of manganese, is dipped just below the surface of the electrolyte bath 12. In a practical cell, an array of multiple cathodes suspended within the electrolyte bath from a common bus bar may be used, there being only one cathode shown here for the purpose of illustration. The anode 14 and he cathode 16 are connected respectively through means of wires 18, 20 into an external circuit (not shown). The circuit includes a source of direct electrical current and means such as a rheostat for controlling the flow of electrical current through the cell.

To carry out the electroformation process of the invention, the external circuit is closed suitably by means of a switch and electrical current is allowed to flow through the cell. Manganese is deposited at the cathode in accordance with the following reaction:

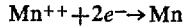

$$Mn^{++} + 2e^- \rightarrow Mn$$

Essentially all of the electrical current flowing through the cell is utilized in forming the manganese deposit.

From the earliest experimental work leading to the invention, it was recognized that one of the essential requirements for carrying out the electroformation process is the maintenance of extremely high cathode current densities. It has been found in accordance with the invention that the cathode current density should be at least about 500 amperes per square foot. This is considerably higher than that used in the conventional electroplating art for depositing smooth coatings of manganese from a manganese sulphate bath wherein a cathode current density of from about 5 to about 45 amperes per square foot has been reported (A Comprehensive Treatise on Inorganic and Theoretical Chemistry, vol. 12, p. 166, by J. W. Mellor). Since the current density is inversely proportional to the cathode surface area for a given current, it is advantageous to employ a cathode of the smallest practical surface area exposed to the electrolyte and preferably a thin wire or rod cathode suitably of manganese is used. During the electroformation process, manganese first deposits at the cathode in the form of individual fibers which may be easily broken off and then collected at the bottom of the electrolyte bath. If the process is allowed to proceed without removing the individual fibers, the electroformation will continue with more and more fibers being deposited from the initial growth at the cathode surfaces. More and more fibers will continue to grow in this manner so long as sufficient electrical current is flowing through the cell, and eventually an interconnected skeletal manganese fibrous mat will be formed. This skeletal fibrous mat consists basically of multiple fibers joined to one or more neighboring fibers in the mat.

Once the electroformation process has been started and the formation of the interconnected skeletal fibrous mat has begun, it may be necessary to periodically increase the flow of electrical current through the cell, such as by means of the rheostat, in order to meet the increased current requirements due to the increasingly greater number of fibers being deposited. It is virtually impossible during this period of the electrodeposition process to determine the cathode current density with and degree of accuracy due to the rapidly changing surface area of the manganese deposits. However, the electroformation process may be expediently carried out by properly controlling the amount of electrical current flowing through the cell to provide an estimated cathode current density which is above the minimum requirement for the electroformation of the fibers. The proper range of cathode current density can be estimated simply by visual observation of the type of deposit or reaction occurring at the cathode. If the cathode current density is too low, no fiber deposit can be observed. The deposit in this instance will be of the level, adherent type or the powdery type. If the cathode current density is too high, gas evolution (hydrogen) will be readily observed.

In the practice of the invention, the electrolyte may contain any manganese salt whose principal requirement is that it be soluble in a solvent of high dielectric constant resulting in a solution of sufficient ionic conductivity to permit the maintenance of at least the minimum cathode current density necessary for electroforming the manganese fibers of the invention.

Suitable soluble manganese salts include the acetate, chloride, fluosilicate, formate, iodide, nitrate, sulfate and thiocyanate. Suitable solvents for the manganese salt include water and organic solvents, notably alcohols such as methanol, ethanol and n-propanol. Cost and conductivity are the two most important factors upon which the choice of the manganese salt and solvent should be based. Manganese chloride is the preferred choice of the manganese salt from the standpoint of cost and conductivity. An aqueous solution of manganese chloride is the most preferred electrolyte solution. Water is the preferred solvent because of its low cost and freedom from fire hazard and toxicity.

The concentration of the soluble manganese salt in the electrolyte solution should be fairly high in order to promote the electroformation process and to maintain a sufficiently high solution conductivity. A saturated solution of manganese chloride in water has been used successfully.

To illustrate the practice of the invention, manganese fibers have been prepared using an electrolysis cell similar to that shown in FIG. 3. The cathode was a single manganese chip with about 0.003 square inch of its surface in contact with the electrolyte. The anode was another manganese chip having about 2 square inches of its area in contact with the electrolyte. The electrolyte was a saturated solution of manganese chloride in water and the anode-to-cathode distance was about 1.5 inches. The electrolyte was maintained at about room temperature. Upon closing the electrical circuit, a current of about 10 milliamperes flowed through the cell and manganese was observed to electrodeposit at the cathode surfaces in the form of individual fibers. The fibers formed initially at the high current density edges of each cathode and could be easily broken off immediately as they were formed by scraping the surfaces of each cathode, the fibers then falling to the bottom of the electrolyte bath.

When the electrolysis was allowed to proceed without removing the fibers, more and more fibers were observed to electrodeposit from the surface of the fibers initially formed at each cathode and this process continued with each of the fibers joining to one or more neighboring fibers until an interconnected skeletal manganese fiber mat was produced. Eventually the weight of the fiber mat so produced caused it to be broken off from the cathode surfaces and the mat then fell to the bottom of the electrolyte bath. The process was continued to produce more fiber mat.

The manganese fibers prepared in the above example were relatively short fibers having a length of about one-tenth of an inch. Shorter fibers of about 0.01 inch in length have also been prepared.

One advantage of the manganese fibers prepared in accordance with the invention is that they possess a relatively high specific surface area as evidenced by the rather rough-surface or "fuzzy" appearance of the fibers shown in the photomicrographs of FIGS. 1 and 2. Although the manganese fibers possess a high specific surface area, they are not so highly developed as to be pyrophoric and subject to rapid oxidation when exposed to the atmosphere.

The fibers prepared in accordance with the invention are composed essentially of pure manganese metal. The electroformation process is accompanied by electropurification and the fibers so prepared are probably one of the purest forms of manganese obtainable within a reasonable economic framework.

It has been found in accordance with the invention that manganese fibers prepared in the manner as described above and then oxidized suitably by an electro-oxidizing treatment to convert the surfaces of the fibers to manganese dioxide can be advantageously used for fabricating galvanic cell cathodes for use in both primary and secondary galvanic dry cells. The electro-oxidizing treatment may be conveniently carried out immediately after the fibers have been electrodeposited by transferring the fibers or the interconnected skeletal fibrous mats while still deposited on the cathode to an oxidizing bath, for example, a solution of manganous sulfate and sulfuric acid. The electrode with the fibers attached is then made the anode and an electrical current is passed through the bath.

After the electro-oxidizing treatment, the cathodes may be readily fabricated by conventional compression molding techniques. The fibers or interconnected skeletal fibrous mats are placed within a suitable mold of the size and configuration desired and then compressed under a suitable pressure say about 50 p.s.i. When the individual fibers are used, the fibers should be thoroughly intermingled with one another so that they are arranged in randomly orientated fashion within the mold with each of the fibers making contact with as many neighboring fibers as possible. It will be seen that the interconnected skeletal fibrous mats are preferred for use in this molding procedure since the fibers in the mat become intermingled during electroforming and are joined to one or more neighboring fibers in the mat. Upon application of pressure, the intermingled fibers readily interlock or interknit producing a compact of high strength and cohesiveness, and low electrical resistance.

Cathodes may also be fabricated in accordance with the invention by compression molding the individual fibers or mats before the electro-oxidizing treatment. In this alternative procedure, the fibers or mats are placed within the mold and compressed to the desired shape or configuration. The shaped cathode is then removed from the mold and subjected to the electro-oxidizing treatment as mentioned above in order to convert the surfaces of the fibers to manganese dioxide.

From the foregoing, it will be seen that the invention provides novel manganese fibers which can be advantageously used to fabricate galvanic cell electrodes and especially cathodes for use particularly in both primary and secondary alkaline galvanic dry cells. The cathodes so prepared in accordance with the invention possess a high strength and cohesiveness and can support their own weight, and, consequently, they do not require an electrochemically inert binder such as used in cathodes of the prior art. Illustratively, the cathodes of the invention may be advantageously used in both primary and secondary alkaline zinc-manganese dioxide galvanic dry cell systems. Electrodes fabricated from the manganese fibers or mats without any electro-oxidizing treatment may be used as metallic manganese anodes in a manganese-manganese dioxide galvanic cell system.

What is claimed is:

1. Stable, high surface area manganese fibers having a central spine portion with some poly-directional side growths, the fibers having a length of between about 0.01 and 0.1 inch and an average diameter of about 0.0005 inch.

2. An interconnected skeletal fibrous mat composed of manganese fibers joined to one or more neighboring manganese fibers, each fiber having an elongated central spine portion with some poly-directional side growth, said fibrous mat resembling finger coral in appearance.

References Cited

UNITED STATES PATENTS

| | | | |
|---|---|---|---|
| 3,065,155 | 11/1962 | Welsh | 204—10 |
| 3,231,341 | 1/1966 | Sump et al. | 29—192 R |

WINSTON A. DOUGLAS, Primary Examiner

C. H. LEFEVOUR, Assistant Examiner

U.S. Cl. X.R.

136—20; 204—10